(12) United States Patent
Trujillo

(10) Patent No.: US 8,103,747 B2
(45) Date of Patent: Jan. 24, 2012

(54) AUTOMATICALLY CONFIGURING A NETWORK DEVICE DURING A DISSIMILAR SYSTEM RESTORE

(75) Inventor: Anthony J. Trujillo, Salt Lake City, UT (US)

(73) Assignee: Symantec Operating Corporation, Mountain View, CA (US)

( * ) Notice: Subject to any disclaimer, the term of this patent is extended or adjusted under 35 U.S.C. 154(b) by 518 days.

(21) Appl. No.: 12/019,365

(22) Filed: Jan. 24, 2008

(65) Prior Publication Data

US 2009/0193102 A1 Jul. 30, 2009

(51) Int. Cl.
*G06F 15/16* (2006.01)

(52) U.S. Cl. ........................................ 709/220; 711/154

(58) Field of Classification Search .................. 709/220; 711/154

See application file for complete search history.

(56) References Cited

U.S. PATENT DOCUMENTS

| | | | | |
|---|---|---|---|---|
| 5,469,573 | A * | 11/1995 | McGill et al. | 717/127 |
| 5,974,547 | A * | 10/1999 | Klimenko | 713/2 |
| 6,080,207 | A * | 6/2000 | Kroening et al. | 717/172 |
| 6,466,972 | B1 * | 10/2002 | Paul et al. | 709/222 |
| 7,565,517 | B1 * | 7/2009 | Arbon | 713/1 |
| 7,603,440 | B1 * | 10/2009 | Grabowski et al. | 709/220 |
| 7,626,944 | B1 | 12/2009 | Riddle | |
| 7,698,389 | B2 | 4/2010 | Sesek | |
| 7,702,732 | B1 | 4/2010 | Squire | |
| 2002/0083156 | A1 * | 6/2002 | Wysoczynski | 709/219 |
| 2003/0191911 | A1 * | 10/2003 | Kleinschnitz et al. | 711/154 |
| 2004/0133689 | A1 * | 7/2004 | Vasisht | 709/228 |
| 2006/0168152 | A1 * | 7/2006 | Soluk et al. | 709/220 |
| 2008/0005611 | A1 * | 1/2008 | Solyanik | 714/6 |
| 2009/0100158 | A1 * | 4/2009 | Sonkin et al. | 709/221 |

OTHER PUBLICATIONS

"Microsoft Windows Graphic Image Deployment and IP Address Configuration," Microsoft Corp., 2003, http://www.microsoft.com/resources/documentation/WindowsServ/2003/all/ADS/en-us/concept_img_ipaddress.mspx?mfr=true.

Miller, "Getting Ready for Windows PE 2.0", Microsoft Corp., TechNet Magazine, Nov. 2006.

* cited by examiner

*Primary Examiner* — Peter-Anthony Pappas
*Assistant Examiner* — Boris Gorney
(74) *Attorney, Agent, or Firm* — Meyertons, Hood, Kivlin, Kowert & Goetzel, P.C.

(57) ABSTRACT

Various embodiments of a system and method for restoring a backup image to a target computer system such that a network device of the target computer system is automatically configured with network settings specified in the backup image are disclosed. A backup image created from a first computer system may be restored to a second computer system, where the backup image includes first network settings for a first network device of the first computer system. The method may comprise configuring an operating system setup program to automatically apply the first network settings to a second network device of the second computer system, and invoking execution of the operating system setup program.

15 Claims, 4 Drawing Sheets

AUTOMATICALLY CONFIGURING A NETWORK DEVICE DURING A DISSIMILAR SYSTEM RESTORE

BACKGROUND OF THE INVENTION

1. Field of the Invention

This invention relates to the field of backup and recovery of computer data.

2. Description of the Related Art

Various software tools exist for backing up a computer system and restoring the backup data to a target computer system. Such tools are provided to permit recovery from user error or hardware failure in the backed-up computer system, or other disaster situations originating outside the computer system that cause data loss such as by damaging the computer system.

One general backup and restore technique is designed to allow the target computer system to be efficiently restored to a state identical to the original computer system as the original computer system existed at the time it was backed up. The technique involves creating a backup image that includes all the data from the original computer system. The backup image may include both operating system files and other program and data files of the original computer system. In the event that it becomes necessary, the backup image may be restored to a target computer system by copying the data from the backup image to the target computer system.

Thus, after the backup image is restored to the target computer system, the target computer system may have an exact copy of the backup image. However, if the target computer system is not identical to the original computer system from which the backup image was created (e.g., if the target computer system has one or more devices that are different than the devices of the original computer system) then simply copying the backup image to the target computer system may not correctly configure the target computer system. Thus, in the case of a dissimilar system restore (e.g., where the target computer system is not identical to the original computer system), a user or administrator is generally required to perform some manual configuration of the target computer system in order to make the target computer system function correctly.

The user or administrator may be required to manually configure various types of settings on the target computer system. In particular, it is typically necessary to manually configure network settings on the target computer system in order to configure it to perform the network functions that were performed by the original computer system, e.g., so that the target computer system can make and accept network connections just as the original computer system did.

For example, consider an original computer system that executes a Windows operating system. The registry information of the original computer system may specify the network settings of a network device in the original computer system. However, the network settings may be correlated with that particular network device. If the target computer system includes a different network device then simply copying the registry information from the backup image to the target computer system may not result in the network settings being correctly correlated with the new network device in the target computer system, thus requiring a user or administrator to manually configure the network settings for the target computer system.

SUMMARY

Various embodiments of a system and method for restoring a backup image to a target computer system are disclosed herein. According to one embodiment of the method, a backup image created from a first computer system may be restored to a second computer system, where the backup image includes first network settings for a first network device of the first computer system. The method may comprise configuring a setup program to automatically apply the first network settings to a second network device of the second computer system. For example, in some embodiments the setup program may be a setup program provided by an operating system of the target computer system, where the setup program is operable to configure network settings used by the operating system, as well as possibly configuring various other operating system settings.

The method may further comprise invoking execution of the setup program. The setup program may execute to automatically apply the first network settings to the second network device of the second computer system.

In some embodiments, configuring the setup program to automatically apply the first network settings to the second network device may comprise automatically generating one or more scripts or commands and configuring the setup program to automatically invoke the one or more scripts or commands, where the one or more scripts are operable to automatically apply the first network settings to the second network device.

BRIEF DESCRIPTION OF THE DRAWINGS

A better understanding of the invention can be obtained when the following detailed description is considered in conjunction with the following drawings, in which.

Figure 1:
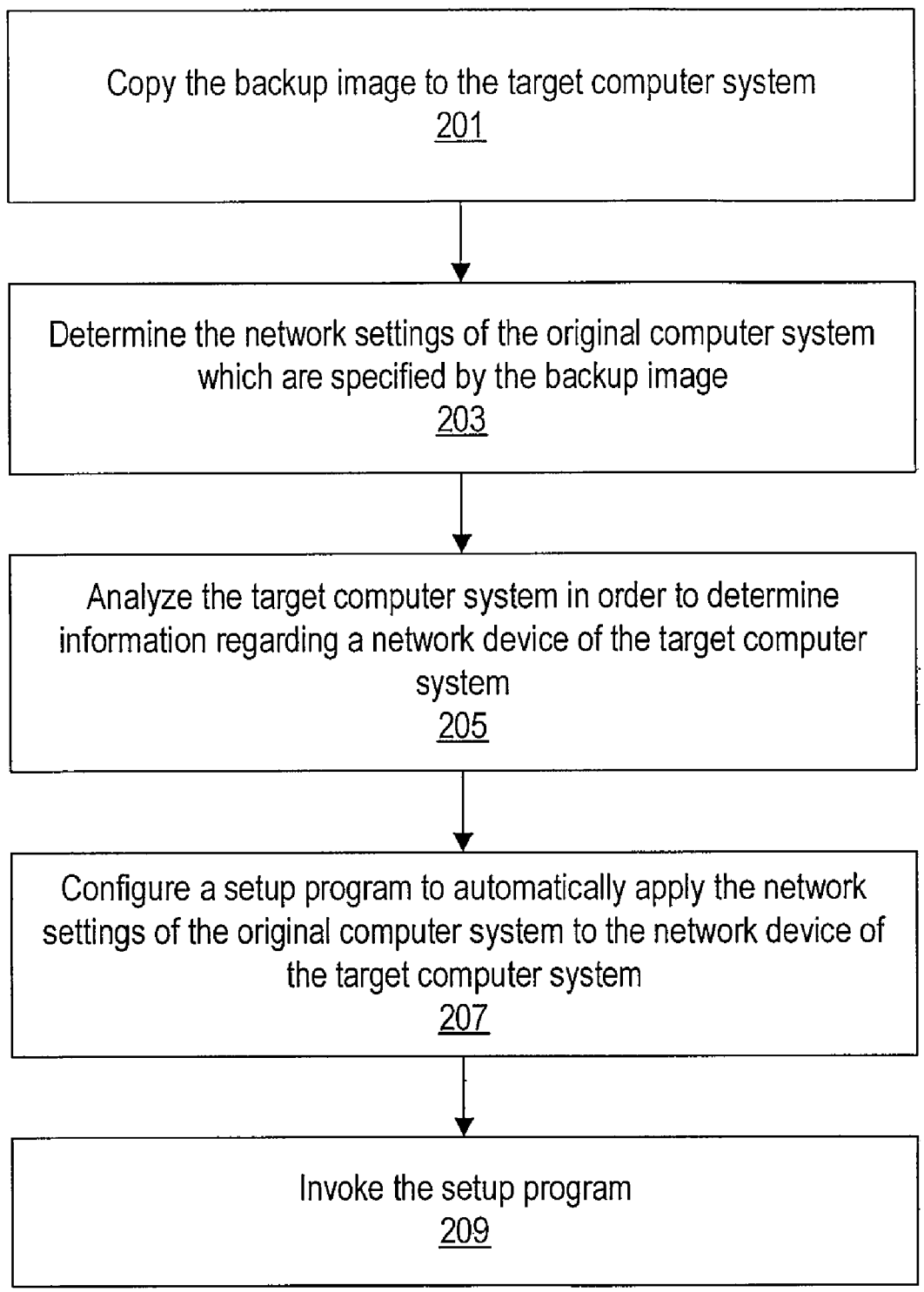
FIG. 1 is a flowchart diagram illustrating one embodiment of a method for restoring a backup image to a target computer system such that a network device of the target computer system is automatically configured with network settings specified in the backup image.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for restoring a backup image to a target computer system are disclosed herein. In some embodiments the restore may be a "bare metal" restore. For example, the target computer system may not yet have any software installed before the restore is performed, or software previously installed on the target computer system may be completely replaced during the restore.

FIG. 1 is a flowchart diagram illustrating one embodiment of a method for performing the restore. The method of FIG. 1 may be implemented by system restore software 32 executing on the target computer system. As indicated in block 201, the system restore software may automatically copy the backup image to a disk drive or other storage device of the target computer system. The system restore software may also determine the network settings of the original computer system from which the backup image was created (e.g., the network settings for a network device of the original computer system), as indicated in block 203. For example, the system restore software may determine the network settings by analyzing the backup image itself or by analyzing information copied from the backup image to the target computer system, such as operating system registry information or other information copied from the backup image. The system restore software may also analyze the target computer system in order to determine information regarding a network device (e.g., network adapter or network interface card) of the target computer system, as indicated in block 205.

The system restore software may then configure a setup program 33 to automatically apply the network settings of the original computer system to the network device of the target computer system, as indicated in block 207. For example, in some embodiments the setup program may be a setup program provided by an operating system of the target computer system, where the setup program is operable to configure network settings used by the operating system, as well as possibly configuring various other operating system settings. The setup program is also referred to herein as "the operating system setup program".

In some embodiments, configuring the setup program may comprise automatically generating one or more scripts or commands based on the network settings of the original computer system and the network device information of the target computer system, and configuring the setup program to automatically invoke the one or more scripts or commands.

The system restore software may then invoke the setup program, as indicated in block 209. The setup program may execute to automatically apply the network settings to the network device of the target computer system. For example, the setup program may execute to automatically invoke the one or more scripts or commands that were generated, where the one or more scripts or commands are operable to automatically apply the network settings to the network device of the target computer system. Applying the network settings to the network device of the target computer system may comprise configuring the network device of the target computer system according to the network settings, e.g., by associating the network settings with the network device so that the network device uses the network settings or so that the operating system of the target computer system uses the network settings when performing network communication through the network device.

In various embodiments the network settings that are applied to the network device of the target computer system may include various kinds of information related to configuration of the network device or related to network communication performed by the network device. For example, in some embodiments the network settings may include information such as: an IP address associated with the network device, an address of a DNS server with which the network device communicates, a WINS server associated with the network device, a physical address associated with the network device, etc.

In some embodiments the network settings may also include static IP addresses used by client programs. For example, the original computer system may have been configured to execute various client programs that communicated with various server programs on remote computer systems through particular IP addresses. When the backup image is restored to the target computer system, the various client programs may be copied to the target computer system. In some embodiments, the system restore software may be operable to automatically configure the client programs on the target computer system to use the particular IP addresses previously used by the client programs on the original computer system, e.g., in order to configure the client programs to correctly communicate with the corresponding server programs. This may eliminate the need for a user or administrator to manually configure the IP addresses used by the client programs on the target computer system.

As noted above, the setup program may execute to automatically apply the network settings to the network device of the target computer system. Execution of the setup program may result in the target computer system being correctly configured with the network settings of the original computer system. For example, the original computer system may have previously connected to a network according to the network settings. If the original computer system has been replaced by the target computer system, the target computer system may now connect to the network according to the same network settings, e.g., may connect to the network just as the original computer system connected to the network. For example, the target computer system may be operable to accept network connections from other computers on the network and make network connections to other computers on the network just as the original computer system did.

In some embodiments the method described above may enable the target computer system to be configured with the network settings of the original computer system completely automatically, e.g., without a user or administrator being required to perform any manual configuration of the network settings on the target computer system. Thus, the efficiency of configuring the target computer system may be substantially increased, e.g., in a disaster recovery scenario where the original computer system is replaced by the target computer system after a failure.

The target computer system may be a dissimilar system with respect to the original computer system from which the backup image was created. For example, the target computer system may differ from the original computer system in one or more of its devices or components. In some embodiments the target computer system may be an entirely different computer system than the original computer system from which the backup image was created. For example, in some situations it may be desirable or necessary to completely replace the original computer system with the target computer system. In other embodiments one or more of the devices or components of the target computer system may be the same as the original computer system. For example, in some embodiments the target computer system may be the same as the original computer system with the exception of a new network device that has replaced an original network device or a new disk drive that has replaced an original disk drive.

As described above, the system recovery software 32 may copy the backup image to the target computer system. The backup image may include operating system files backed up from the original computer system. However, since the target computer system may be a dissimilar system with respect to the original computer system, simply copying the operating system files to the target computer system may not correctly configure the target computer system. In particular, simply copying the operating system files to the target computer system may not result in the network device of the target computer system being correctly installed in the operating system on the target computer system.

Thus, at the time the system recovery software 32 configures the operating system setup program 33 to automatically apply the network settings to the network device of the target computer system, the network device may not yet be installed in the operating system. (The network device may be physically installed in the target computer system, but the operating system on the target computer system may not yet be configured to recognize and use the network device.) However, when the system recovery software 32 analyzes the target computer system in block 205, the system recovery software 32 may determine information regarding the network device which enables the system recovery software 32 to know how to correctly configure the operating system setup program 33 to apply the network settings to the network device, even though the network device has not yet been installed in the operating system when the operating system setup program 33 is configured. For example, the system recovery software 32 may execute within a recovery environment 30 which implements a temporary operating system 34. The system recovery software 32 may analyze information of the temporary operating system 34 in order to determine information regarding the network device which allows the system recovery software 32 to correctly configure the operating system setup program 33 to apply the network settings to the network device. Examples of techniques for configuring setup programs for Windows operating systems are described below.

Figure 2:
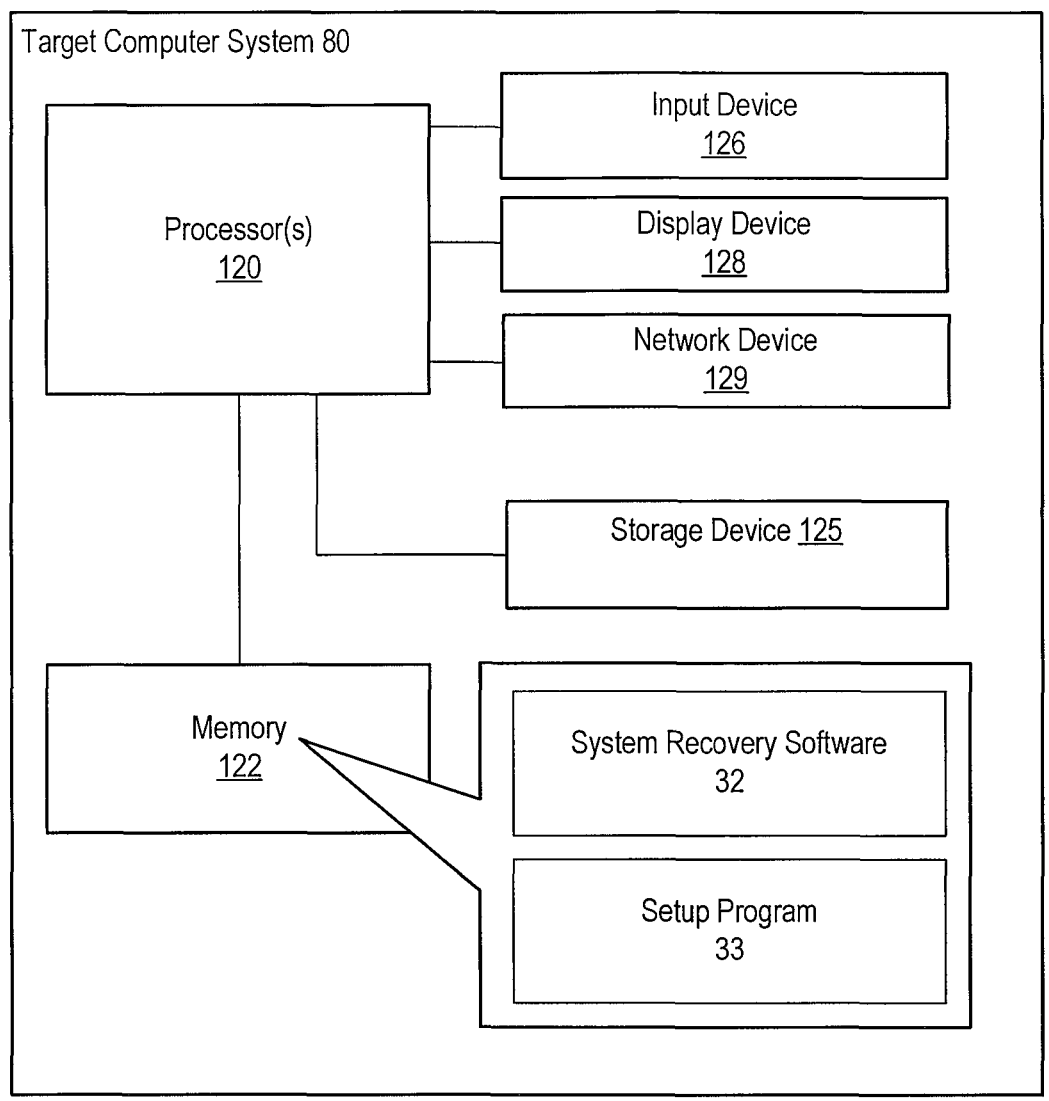
FIG. 2 illustrates one embodiment of the target computer system.

In various embodiments, the target computer system may be any type of computer system and may include or be coupled to any of various kinds of devices. FIG. 2 illustrates one embodiment of a target computer system 80. In this example, the target computer system 80 includes one or more processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the system recovery software 32. The system recovery software 32 may be executed by the one or more processors 120 to perform the restore method described herein. For example, the system recovery software 32 may configure a setup program 33 to automatically apply the network settings from the original computer system to the network device 129 of the target computer system 80. The memory 122 may also store the setup program 33 which is configured and invoked by the system recovery software 32 and which executes to automatically apply the network settings to the network device 129.

In various embodiments the system recovery software 32 may be implemented in any of various ways and may have any desired software architecture. For example, in some embodiments the system recovery software 32 may be implemented as a single software program. In other embodiments the system recovery software 32 may be implemented as two or more software programs or applications that operate in conjunction with each other.

Referring again to FIG. 2, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the target computer system 80 may include multiple processors 120.

The target computer system 80 also includes or is coupled to one or more storage devices 125. In various embodiments the storage devices 125 may include any of various kinds of storage devices operable to store data, such as optical storage devices, disk drives, tape drives, flash memory devices, etc. As one example, the storage devices 125 may be implemented as one or more disk drives configured independently or as a disk storage system. The system recovery software 32 may copy the backup image created from the original computer system to one or more of the storage devices 125 of the target computer system 80.

The target computer system 80 may also include a network device 129 through which the target computer system 80 is coupled to a network. The network device 129 may include hardware for coupling the target computer system 80 to the network, such as a network adapter or network interface card or chipset. The network device 129 may couple the target computer system 80 to the network in either a wired or a wireless manner. In various embodiments, the target computer system 80 may be coupled to any type of network, such as a local area network (LAN), a wide area network (WAN), a wireless network, an Intranet, the Internet, etc. Examples of local area networks include Ethernet networks, Fiber Distributed Data Interface (FDDI) networks, and token ring networks. Wired mediums for coupling the target computer system 80 to the network may include Ethernet, fiber channel, a modem connected to plain old telephone service (POTS), etc. Wireless mediums may include a wireless connection using a wireless communication protocol such as IEEE 802.11 (wireless Ethernet), a modem link through a cellular service, a satellite link, etc.

The target computer system 80 may also include one or more input devices 126 for receiving user input from a user of the target computer system 80. The input device(s) 126 may include any of various types of input devices, such as keyboards, keypads, microphones, or pointing devices (e.g., a mouse or trackball). The target computer system 80 may also include one or more output devices 128 for displaying output to the user. The output device(s) 128 may include any of various types of output devices or display devices, such as LCD screens or monitors, CRT monitors, etc.

As noted above, in some embodiments the target computer system 80 may be a bare metal system on which no software is installed before the backup image is restored to the target computer system 80. In some embodiments the target computer system 80 may couple to a server computer system that provides a boot image to the target computer system 80. When the target computer system 80 is booted to perform a restore, the target computer system 80 may use standard network boot protocols to boot using the boot image. In other embodiments, a media boot is supported in which the boot image is stored on a computer accessible medium such as a compact disk (CD) or digital video disk (DVD), and the disk is used to boot the target computer system 80. In such embodiments, the server computer system may be eliminated.

Figure 3:
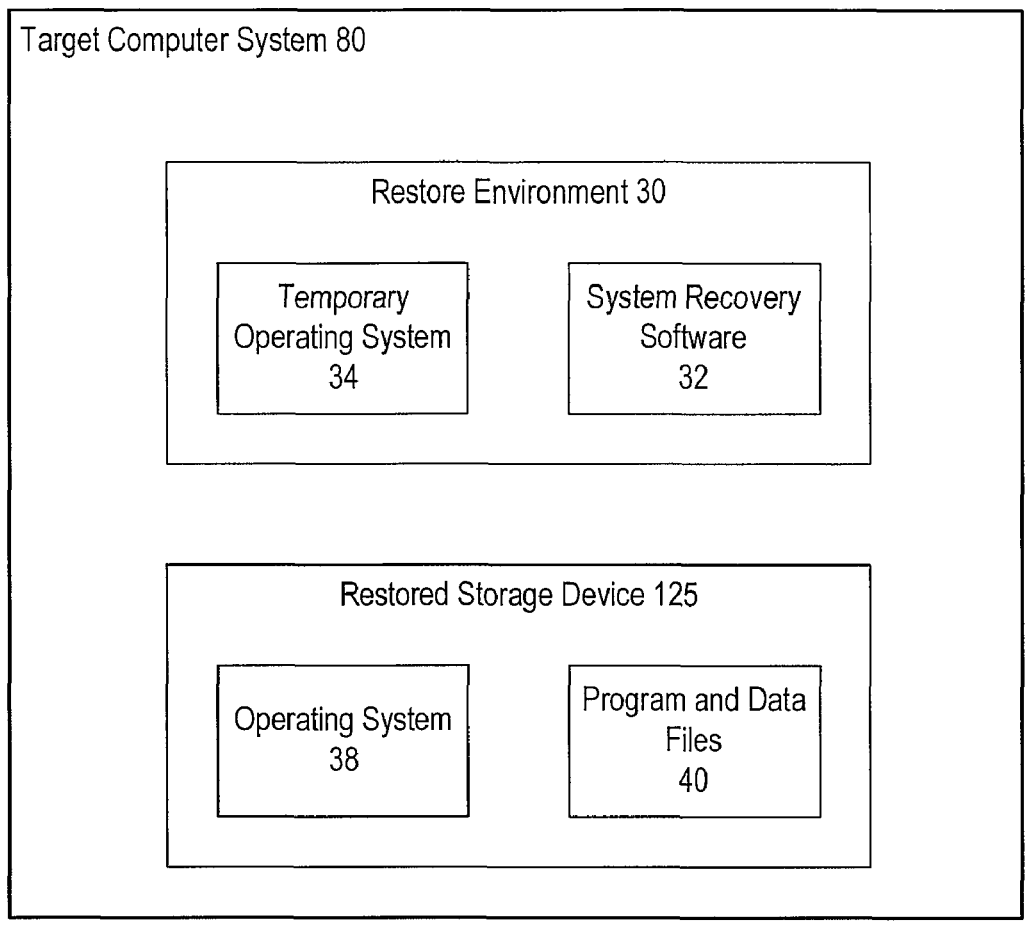
FIG. 3 illustrates a restore environment in which system recovery software executes on the target computer system.

When the target computer system 80 is booted, a restore environment 30 may be created on the target computer system 80, as illustrated in FIG. 3. The restore environment 30 may include a temporary operating system (OS) 34. The system recovery software 32 may execute under control of the temporary operating system 34 in order to restore the backup image to the target computer system 80. As illustrated in FIG. 3, the backup image may be restored to one or more of the storage devices 125 of the target computer system 80. More particularly, the backup image may include an operating system 38 and a set of program and data files 40 that are restored to the storage device(s) 125. The program and data files 40 may include various application software and other instruction code files, as well as data files.

In some embodiments the restore environment 30 is provided for performing the restore operation only, and the restore environment 30, temporary operating system 34, and system recovery software 32 are removed once the restore operation is complete. The temporary operating system 34 may be an entirely different operating system than the operating system 38 that is restored to the target computer system 80, or may be a different version of the operating system 38. In some embodiments, the restore environment 30 may be created in a first partition of the storage device 125, and the operating system 38 and program and data files 40 may be restored in a second partition of the storage device 125. In such an embodiment the system recovery software 32 may mark the second partition as the boot partition and delete the first partition of the restore environment 30 after restoring the backup image to the second partition.

Figure 4:
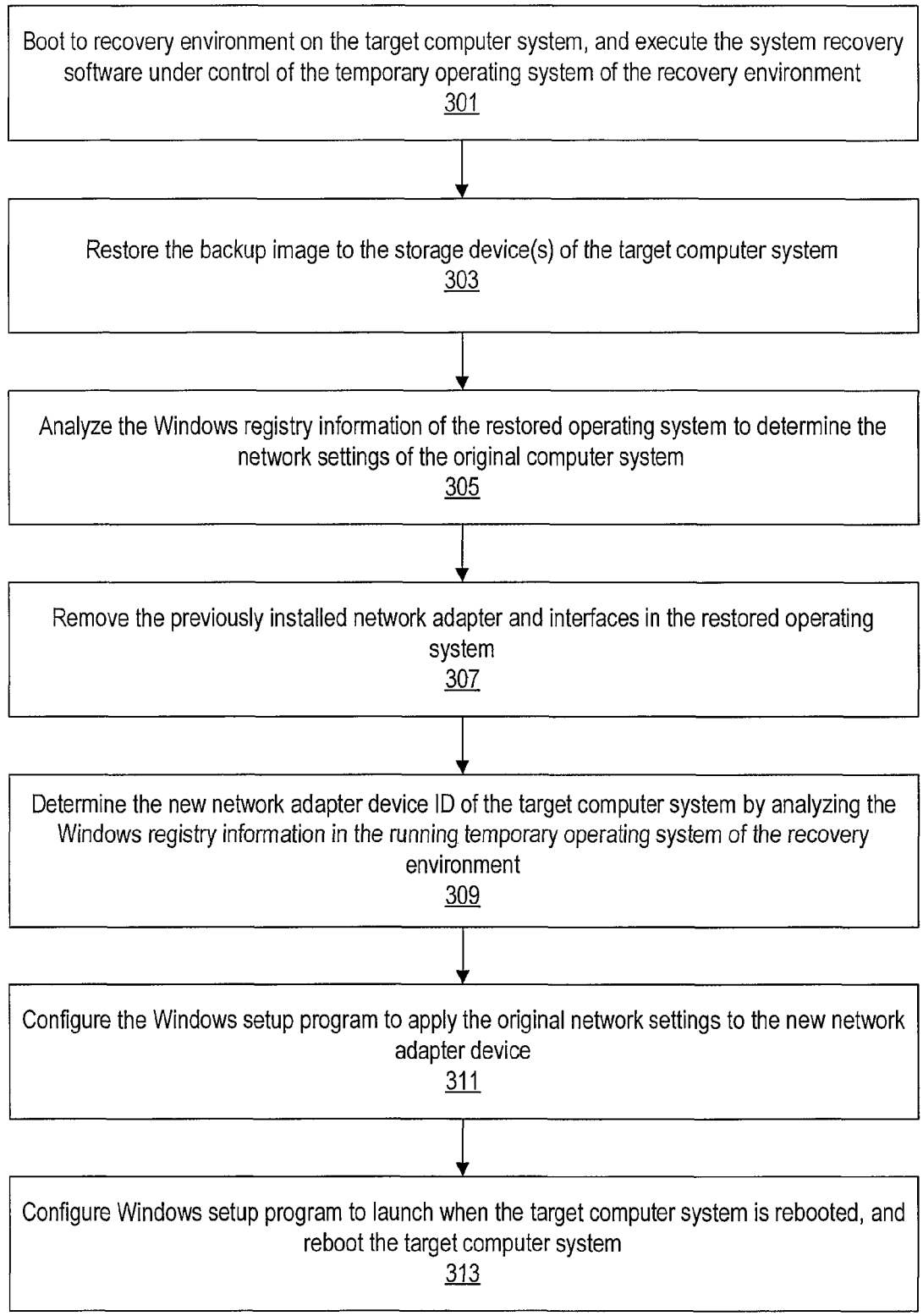
FIG. 4 illustrates a more detailed embodiment of the method of FIG. 1.

FIG. 4 is a flowchart illustrating a more detailed embodiment of the method of FIG. 1, where the method in this embodiment is used in restoring a Windows operating system to the target computer system 80, e.g., where the original computer system from which the backup image was created executed a Windows operating system, and where the backup image includes the Windows operating system files. Although FIG. 4 describes the method in the context of a Windows operating system, it is noted that in other embodiments the method may be used in restoring other types of operating systems to the target computer system 80, e.g., such as Linux or other Unix operating systems, or Mac operating systems. As used herein, the term "Windows operating system" refers to any version of a Windows operating system by Microsoft Corp. Various embodiments of FIG. 4 may be used in restoring various versions of Windows operating systems, such as Windows 2000, Windows XP, Windows 2003, Windows Vista, or Windows 2008.

As indicated in block 301, the target computer system may be booted to the recovery environment 30. As described above, the recovery environment 30 may implement a temporary operating system 34. The system recovery software 32 may be configured to automatically begin executing under control of the temporary operating system 34 of the recovery environment 30 when the target computer system 80 boots.

As indicated in block 303, the system recovery software 32 may restore the backup image to one or more storage devices 125 of the target computer system 80, e.g., where the backup image was created from an original computer system. Restoring the backup image may comprise copying data from the backup image to the one or more storage devices 125 of the target computer system 80.

As used herein, the term "backup image" refers to a copy of files from the original computer system, e.g., operating system files, as well as possibly other program and data files. In some embodiments, the backup image may include a sector-by-sector copy of the data on one or more storage devices of the original computer system. In other embodiments the data may be represented or included in the backup image using other techniques, e.g., where files from the original computer system are stored as files in the backup image.

In some embodiments the backup image may also include metadata in addition to the data copied from the original computer system. For example, when the backup image is created, backup software may be operable to not only copy the data from the original computer system into the backup image, but may also analyze the original computer system to create metadata or configuration data representing a state or configuration of the original computer system, and may include the metadata or configuration data in the backup image. For example, in some embodiments the metadata of the backup image may include information indicating which network adapter device driver to install when the backup image is subsequently restored to a target computer system.

Since the original computer system executed a Windows operating system, the backup image created from the original computer system may include Windows registry information. When the backup image is restored to the target computer system 80, the Windows registry information may be copied to the target computer system 80, e.g., in the restored Windows operating system on the target computer system 80. The registry information may include information specifying the network settings of the original computer system.

In some embodiments, the system recovery software 32 may analyze the Windows registry information in the restored Windows operating system on the target computer system 80 (or in the backup image) to determine the network settings of the original computer system, as indicated in block 305. For example, the system recovery software 32 may look up the network settings information from the registry under the NetCfgInstanceId key.

As indicated in block 307, the system recovery software 32 may remove the previously installed network adapter and interfaces in the restored Windows operating system. This may eliminate "ghost nics". Ghost nics with networks settings applied keep those settings, and the operating system can no longer use them or apply them to another network adapter.

As indicated in block 309, the system recovery software 32 may determine the network adapter device ID of the network device 129 of the target computer system 80 by analyzing the Windows registry information in the running temporary operating system 34 of the recovery environment 30. The network adapter device ID of the network device 129 may be obtained by looking it up under the registry's device ENUM key, which indicates what network adapter devices are currently available. In some embodiments the backup image may include metadata used in determining the network adapter device ID, e.g., the NIC INFID.

As indicated in block 311, the system recovery software 32 may then configure the Windows setup program to apply the original network settings to the new network adapter device, e.g., using the network adapter device ID obtained in block 309.

The Windows setup program is capable of performing different types of setup operations. The system recovery software 32 may configure the Windows setup program to perform a type of setup known as a mini-setup. The mini-setup may not perform a complete setup of Windows on the target computer system, but may instead perform a Plug & Play refresh in order to recognize the devices installed in the target computer system 80 (including the network device 129) and configure Windows to communicate with and use the devices. In block 311, the system recovery software 32 may automatically generate one or more scripts or commands operable to apply the original network settings to the new network adapter device and may configure the Windows setup program to automatically invoke the one or more generated scripts or commands during its execution after the Plug & Play refresh has been performed. In some embodiments, automatically generating the one or more scripts or commands may include automatically generating an Unattended Answers file used by the Windows setup program to automatically configure the Windows operating system on the target computer system without requiring user input. Automatically generating one or more scripts or commands may also include generating a VBScript file or other script file containing commands operable to configure Windows network settings. The particular scripts or commands that are generated may differ for different versions of Windows. Examples of automatically generating scripts for different versions of Windows are described below.

As indicated in block 313, the system recovery software 32 may configure the Windows setup program to automatically launch when the target computer system 80 is rebooted, and may cause the target computer system 80 to reboot. When the target computer system 80 reboots, the Windows setup program may perform the Plug & Play refresh which installs the network adapter device 129. The Windows setup program may also automatically invoke the one or more scripts or commands generated by the system recovery software 32 and block 311, which are operable to apply the original network settings to the network adapter device 129.

The Windows setup program may then cause the target computer system 80 to reboot. After rebooting, the target computer system 80 may be ready for user login and may be able to accept and make network connections according to the original network settings. It is noted that in some embodiments no user input manually configuring the target computer system 80 with any information related to the network settings is required in the process described above.

As noted above, the system recovery software 32 may be operable to configure the Windows setup program to apply the network settings to the network device 129 in the target computer system 80 using different techniques, e.g., according to which particular version of Windows is being restored on the target computer system 80.

In some embodiments, if the restored operating system is a version of Windows 2000, Windows XP, or Windows 2003 then the system recovery software 32 may configure the Windows setup program as follows: While setting up the unattended answer file, place in the new network adapter device ID. Use the new network adapter device ID, and set the connection name to a known value in the unattended answer file. Use the known network connection name in the network settings script creation. This tells the Windows setup program which settings to apply to a given network adapter. Instruct the Windows setup program to run the network settings script by updating the unattended answer file.

The above techniques for Windows 2000, Windows XP, and Windows 2003 use the network device id to seed the connection name. The following is an example illustrating the relevant portion of the Unattended Answers file generated by the system recovery software 32 in the case of Windows 2000, Windows XP, or Windows 2003:

```
[NetAdapters]
Adapter01=params.Adapter01
[params.Adapter01]
INFID="PCI\VEN_10B7&DEV_9050"
ConnectionName="Connection 1"
```

The following is an example illustrating the relevant portion of a network adapter settings script generated by the system recovery software 32 in the case of Windows 2000, Windows XP, or Windows 2003:

```
C:\Sysprep\$OEM$\netsh interface ip set address
name="Connection 1" static 192.168.0.101 255.255.255.0
192.168.0.10 auto
```

In some embodiments, if the restored operating system is a version of Windows Vista or Windows 2008 then the system recovery software 32 may configure the Windows setup program as follows: While generating the network settings file, use the known network connection name in the network settings script creation. This tells the Windows setup program which settings to apply to a given network adapter. The settings connection script uses the known network adapter ID to look up and apply the network settings using the MAC address as the key to the various network adapter system database tables. Instruct the Windows setup program to run the network settings script by updating the unattended answer file.

The above techniques for Windows Vista and Windows 2008 use the network device id to lookup the device Mac address. The following is an example illustrating the relevant portion of a network adapter settings script in the case of Windows Vista or Windows 2008:

```
NIC1=Array("PCI\VEN_10DE&DEV_0057&
SUBSYS_81411043&REV_A3","192.168.79.1",
"255.255.255.0","192.168.79.3,192.168.79.4","192.168.79.2")
PnPIds=Array(NIC1)
```

(If the network device id is in Win32_NetworkAdapter then match the MAC address to Win32_NetworkAdapterConfiguration and apply the settings.)

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A tangible, non-transitory computer-accessible storage medium storing program instructions, wherein the program instructions are executable by a target computer system to:

create a first operating system on the target computer system, wherein the target computer system includes a first network device;

copy an entire backup image created from a source computer system to the target computer system, wherein the backup image includes a second operating system, wherein copying the backup image to the target computer system installs the second operating system on the target computer system, wherein the second operating system includes registry information, wherein network settings for a second network device of the source computer system are included in the registry information;

analyze the registry information of the second operating system to determine the network settings for the second network device of the source computer system;

analyze information of the first operating system to determine information regarding the first network device of the target computer system;

configure a setup program to use the information regarding the first network device and the network settings determined by analyzing the registry information of the second operating system to automatically apply the network settings to the first network device of the target computer system after the backup image has been copied to the target computer system; and remove the first operating system from the target computer system.

2. The computer-accessible storage medium of claim 1, wherein the program instructions are further executable to configure the setup program to install the first network device in the second operating system of the target computer system in addition to applying the network settings to the first network device.

3. The computer-accessible storage medium of claim 1, wherein the program instructions are further executable to:

invoke execution of the setup program, wherein the setup program executes to automatically apply the network settings to the first network device of the target computer system.

4. The computer-accessible storage medium of claim 1, wherein configuring the setup program to automatically apply the network settings to the first network device comprises:

automatically generating one or more scripts; and configuring the setup program to automatically invoke the one or more scripts, wherein the one or more scripts are operable to automatically apply the network settings to the first network device.

5. The computer-accessible storage medium of claim 1, wherein analyzing the registry information of the second operating system to determine the network settings comprises accessing the registry information on the target computer system after copying the registry information from the backup image to the target computer system.

6. A target computer system comprising:

one or more processors;

memory storing program instructions;

a first network device; and a first storage device;

wherein the program instructions are executable by the one or more processors to implement:

creating a first operating system on the target computer system;

copying an entire backup image created from a source computer system to the first storage device of the target computer system, wherein the backup image includes a second operating system, wherein copying the backup image to the first storage device of the target computer system installs the second operating system on the target computer system, wherein the second operating system includes registry information, wherein network settings for a second network device of the source computer system are included in the registry information;

analyzing the registry information of the second operating system to determine the network settings for the second network device of the source computer system; and analyzing information of the first operating system to determine information regarding the first network device of the target computer system;

configuring a setup program to use the information regarding the first network device and the network settings determined by analyzing the registry information of the second operating system to automatically apply the network settings to the first network device of the target computer system after the backup image has been copied to the target computer system; and removing the first operating system from the target computer system.

7. The system of claim 6, wherein the program instructions are further executable by the one or more processors to configure the setup program to install the first network device in the second operating system of the target computer system in addition to applying the network settings to the first network device.

8. The system of claim 6, wherein the program instructions are further executable by the one or more processors to:

invoke execution of the setup program, wherein the setup program executes to automatically apply the network settings to the first network device of the target computer system.

9. The system of claim 6, wherein configuring the setup program to automatically apply the network settings to the first network device comprises:

automatically generating one or more scripts; and configuring the setup program to automatically invoke the one or more scripts, wherein the one or more scripts are operable to automatically apply the network settings to the first network device.

10. A computer-implemented method comprising:

creating a first operating system on a target computer system, wherein the target computer system includes a first network device;

copying an entire backup image created from a source computer system to the target computer system, wherein the backup image includes a second operating system, wherein copying the backup image to the target computer system installs the second operating system on the target computer system, wherein the second operating system includes registry information, wherein network settings for a second network device of the source computer system are included in the registry information;

analyzing the registry information of the second operating system to determine the network settings for the second network device of the source computer system;

analyzing information of the first operating system to determine information regarding the first network device of the target computer system;

configuring a setup program to use the information regarding the first network device and the network settings determined by analyzing the registry information of the second operating system to automatically apply the network settings to the first network device of the target computer system after the backup image has been copied to the target computer system; and removing the first operating system from the target computer system.

11. The method of claim 10, wherein the method further comprises configuring the setup program to install the first network device in the second operating system of the target computer system in addition to applying the network settings to the first network device.

12. The method of claim 10, further comprising:
invoking execution of the setup program, wherein the setup program executes to automatically apply the network settings to the first network device of the target computer system.

13. The method of claim 10, wherein configuring the setup program to automatically apply the network settings to the first network device comprises:
automatically generating one or more scripts; and
configuring the setup program to automatically invoke the one or more scripts, wherein the one or more scripts are operable to automatically apply the network settings to the first network device.

14. The method of claim 10,
wherein copying the backup image to the target computer system comprises copying the backup image from a first storage device to a second storage device of the target computer system;
wherein analyzing the registry information of the second operating system to determine the network settings comprises analyzing the registry information in the backup image on the first storage device.

15. The method of claim 10,
wherein copying the backup image to the target computer system comprises copying the backup image from a first storage device to a second storage device of the target computer system;
wherein analyzing the registry information of the second operating system to determine the network settings comprises analyzing the registry information on the second storage device after the backup image has been copied to the second storage device.

* * * * *